United States Patent Office 3,523,120
Patented Aug. 4, 1970

3,523,120
PIPERONYL-PIPERAZINE COMPOUNDS
Laszlo Beregi, Boulogne-sur-Seine, Pierre Hugon, Rueil-Malmaison, and Michel Laubie, Vaucresson, France, assignors to Societe en nom collectif "Science Union et Cie, Société Francaise de Recherche Medicale," Suresnes, France, a society of France
No Drawing. Filed June 7, 1967, Ser. No. 644,059
Claims priority, application France, June 30, 1966, 67,675
Int. Cl. C07d 51/70
U.S. Cl. 260—268                                                7 Claims

ABSTRACT OF THE DISCLOSURE

Piperonyl piperazine compounds substituted, in position 4, by —A —Ar wherein:

—A is a linear or branched polymethylene chain containing a ketone function or a secondary alcohol function, and
—Ar is phenyl, tolyl, xylyl or fluorophenyl.

These compounds possess neuroleptic, vasodilator, adrenolytic and anti-emetic properties.

---

The present invention provides piperonyl piperazine compounds of the general formula

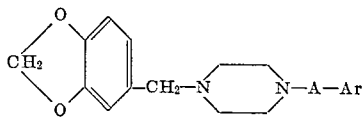

wherein A represents a linear or branched polymethylene chain containing a ketone function or a secondary alcohol function, such as:

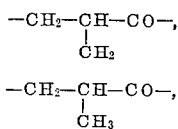

or

—CH$_2$—CH$_2$—CH$_2$—CHOH— and Ar represents a phenyl, tolyl, xylyl or fluorophenyl radical, and their physiologically tolerable addition salts with organic or mineral acids.

The compounds of the invention are obtained by reacting 1-piperonyl piperazine with an aroylalkyl chloride of the formula Ar—CO—CH$_2$—CH$_2$—CH$_2$—Cl, or with a propiophenone of formula

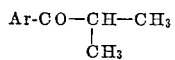

wherein Ar has the values previously defined. In the last case, paraformaldehyde is added, and the reaction is performed in the presence of hydrochloric acid. The carbonyl compounds may then be subjected to reduction using lithium aluminium hydride in ethereal medium to obtain the corresponding hydroxylated derivatives.

The addition salts are formed with mineral acids such, for example, as hydrochloric, hydrobromic, methanesulfonic, sulphuric and phosphoric acids, or with organic acids such, for example, as acetic, propionic, maleic, fumaric, tartaric, citric, oxalic and benzoic acids.

The new compounds of the invention, and their addition salts, possess valuable pharmacological and therapeutic properties and may thus be used a medicaments with pharmaceutically suitable carriers.

In pharmacological and clinical tests, it was found that these derivatives exhibit a potent therapeutic, especially neuroleptic, vasodilator, adrenolytic and anti-emetic activity.

The acute toxicity was determined by intraperitoneal administration to mice, and computed by the method of Litchfield and Wilcoxon. The LD$_{50}$ is situated between 75.5 and 184 mg./kg. for the different compounds studied.

The subchronic toxicity of 1-piperonyl-4-[1'-(p-fluorophenyl)-1'-oxo-but-4'-yl]piperazine was also studied in mice. Four groups of 16 mice were treated for 2 months, every day by intubation with 2.5, 5, 10 and 20 mg./kg. of the product, respectively. One half of the animals of each group was sacrificed at the end of the treatment, and the other half one month later. The organs of the sacrificed animals were subjected to an histological examination. No pathological modification of toxicity was noted.

In studying the action of the new compounds on the central nervous system, an appreciable reduction of the spontaneous activity of the mouse placed in a trembling cage was noted at doses from 5 to 20 mg./kg. I.P. At the same dose, they inhibit the conditioned reflexes of the rat from 24 to 98%. This inhibition is within the range for chlorpromazine. Some of the compounds are able to protect the mouse against tremors provoked by the I.P. injection of 25 mg./kg. of tremorine at these doses, but the doses used to obtain protection of the animals against convulsions provoked by electroshock and pentetrazol are somewhat larger, e.g., 30 to 40 mg./kg. No antagonizing effect to the nicotinic and strychnic convulsions is observed for these compounds.

Barbituric narcosis is strongly potentiated by the new compounds. For example, 1-piperonyl-4-[1'-(p-fluorophenyl)-1'-oxo but-4'-yl]piperazine injected by I.P. route, at a dose of 10 mg./kg., prolongs the sleep induced by injection of 20 mg./kg. of penthiobarbital—which is 1min.29 in the untreated animals (recovery time of straightening reflex)—up to 38min.11 on an average.

It was also noted that mice were protected against the toxicity of amphetamine with 5 mg./kg. of the same compounds; only 20% of the animals treated died with an injection of 25 mg./kg. of amphetamine, against 60% in the untreated control animals.

The spasmolytic action of the compounds of the invention was demonstrated on the isolated duodenum of the rat by the inhibition of spasms provoked by barium chloride. For some compounds the concentration inhibiting 50% of the spasms is close to that of papaverine.

Administered at a dose of 1.5 to 5 mg./kg. per os, the new compounds inhibit vomiting induced by 0.1 mg./kg. of apomorphine in the dog.

An anti-hypertensive action was also noted for the compounds of the invention. At a dose of 2 to 8 mg./kg. per os in the hypertonic rat, the blood pressure diminishes from 20 to 35 mm. Hg for 4 to 24 hours. Perfused intravenously in the dog, at a dose of 40 gamma/kg./min. for 10 minutes, an increase of the femoral output is noted despite a decrease in the blood pressure, cardiac output and work.

The adrenolytic action of the compounds of the invention was shown on the seminal vesicles of the rat. Some derivatives exhibit an adrenolytic activity of 50 to 60% with concentrations of 10$^{-6}$–10$^{-8}$, often superior to the activity of 2-(1-piperidyl methyl)-1,4 benzodioxan(piperoxane).

The here-above described properties and the low toxicity of these compounds permit their use in human therapy, especially in the treatment of hypertension, and circulatory, digestive and nervous disorders.

The compounds of the invention can be administered in various pharmaceutical forms such, for example, as tablets, dragees, capsules, suppositories or solutions, in association with different pharmaceutical solid or liquid carriers such, for example, as distilled water, glucose, lactose, talc, gum-arabic, magnesium stearate or ethyl cellulose.

The doses may vary from 10 to 100 mg. in parenteral, rectal or oral administration.

The following examples illustrate the invention, but are not to be construed as limiting, the parts being by weight unless otherwise stated, and the melting points being determined under the microscope on a Kofler heater.

EXAMPLE 1

1-piperonyl-4-[1'-(p-fluorophenyl)-1'-oxo-but-4'-yl]piperazine

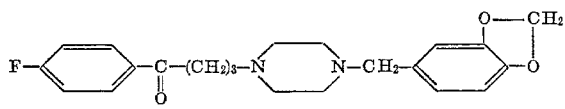

40 parts of 4-chloro-(p-fluoro butyrophenone) and 88 parts of 1-piperonyl piperazine in solution in 400 parts of anhydrous xylene are refluxed under stirring for 12 hours. After cooling, the hydrochloride of 1-piperonyl piperazine is suctioned off, washed with twice 30 parts of xylene, and the filtrate eliminated under vacuum.

The residue is treated with 200 parts of glacial acetic acid, and 60 parts of 4.7 N hydrochloric ether are added to the solution obtained. The hydrochloride which has precipitated is dissolved again by heating after addition of 170 parts of acetic acid. There were obtained 54 parts of the hydrochloride of 1-piperonyl-4-[1'-(p-fluorophenyl)-1'-oxo but-4'-yl]piperazine. M.P. 228–230° C. (with decomposition).

By the same method, the following derivatives were prepared:

(a) 1-piperonyl-4-[1'-(m,p-dimethylphenyl-1'-oxo but-4'-yl]piperazine. The dihydrochloride melts at 230–235° C. (acetic acid) starting from 4-chloro m,p-dimethylbutyrophenone and 1-piperonyl piperazine.

(b) 1-piperonyl-4-(1'-phenyl-1'-oxo but-4'-yl) piperazine. The dihydrochloride melts at 202–203° C. (acetic acid) starting from 4-chloro butyrophenone and 1-piperonyl piperazine.

(c) 1-piperonyl-4-[1'-(p-methylphenyl)-1'-oxo but-4'-yl]piperazine. The dihydrochloride melts at 225–230° C. (acetic acid) starting from 4-chloro p-methyl butyrophenone and 1-piperonyl piperazine.

EXAMPLE 2

1-piperonyl-4-[1'-(p-fluorophenyl)-1'-oxo 2'-methyl prop-3'-yl]piperazine

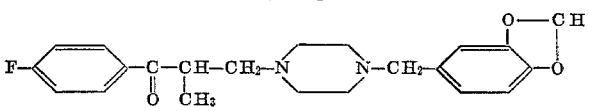

13.2 parts of piperonyl piperazine, 11 parts of p-fluoro propiophenone, 15.7 parts of hydrochloric acid (d.:1.19), 60 parts of methanol, 6 parts of water and 3.6 parts of paraformaldehyde are refluxed for 6 hours under stirring. 1.8 parts of paraformaldehyde are then added and the reaction mixture is refluxed for 6 hours. After standing for 12 hours, 6 parts of salt are obtained which, after recrystallization in 400 parts of absolute ethanol, give 4.6 parts of the dihydrochloride of 1-piperonyl-4-[1'-(p-fluorophenyl)-1'-oxo 2'-methyl prop-3'-yl]piperazine, melting at 224–228° C.

EXAMPLE 3

1-piperonyl-4-[1'-(p-fluorophenyl)-1'-hydroxy but-4'-yl]piperazine

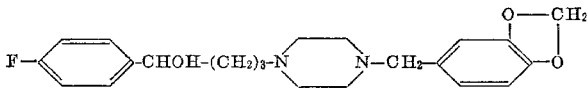

9 parts of 1-piperonyl-4-[1'-(p-fluorophenyl)-1'-oxo but-4'-yl]piperazine in solution in 300 parts of anhydrous ether are added in 30 minutes to 2.5 parts of lithium aluminium hydride and 100 parts of anhydrous ether with mechanical stirring. After a reflux of 2 hours, the mixture is hydrolized by addition of water, the solids filtered off and the filtrate evaporated to dryness.

The residue is taken up with 200 parts of anhydrous methanol, and 7 parts of 5 N hydrochloric ether are added. The dihydrochloride which has precipitated is dissolved again, 200 parts of methanol being added for this purpose. After cooling and drying, there were obtained 4 parts of the dihydrochloride of 1-piperonyl-4-[1'-(p-fluorophenyl)-1'-hydroxy but-4'-yl]piperazine melting at 232–238° C.

We claim:
1. A compound selected from the group consisting of
(A) piperonyl-piperazine compounds of the general formula:

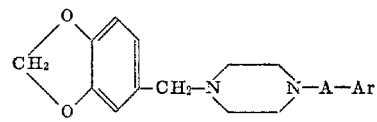

wherein

—A represents a polymethylene chain selected from the group consisting of: —CH$_2$—CH$_2$—CH$_2$—CO—, $$-CH_2-CH-CO-$$
$$\phantom{-CH_2-}|\phantom{-CO-}$$
$$\phantom{-CH_2-}CH_3$$

and —CH$_2$—CH$_2$—CH$_2$—CHOH—, and

—Ar represents a substituent selected from the group consisting of: phenyl, tolyl, xylyl, and fluorophenyl,
and (B) physiologically acceptable addition salts thereof with organic and mineral acids.

2. A compound of claim 1 which is 1-piperonyl-4-[1'-(p-fluorophenyl)-1'-oxo but-4'-yl]piperazine.

3. A compound of claim 1 which is 1-piperonyl-4-[1'-(m,p-dimethylphenyl)-1'-oxo but-4'-yl]piperazine.

4. A compound of claim 1 which is 1-piperonyl-4-(1'-phenyl-1'-oxo but-4'-yl]piperazine.

5. A compound of claim 1 which is 1-piperonyl-4-[1'-(p-methylphenyl)-1'-oxo but-4'-yl]piperazine.

6. A compound of claim 1 which is 1-piperonyl-4-[1'-(p-fluorophenyl)-1'-oxo-2'-methyl prop-3'-yl]piperazine.

7. A compound of claim 1 which is 1-piperonyl-4-[1'-(p-fluorophenyl)-1'-hydroxy but-4'-yl]piperazine.

References Cited
UNITED STATES PATENTS

| | | | |
|---|---|---|---|
| 3,362,956 | 1/1968 | Archer | 260—268 |
| 3,370,066 | 2/1968 | Thominet | 260—268 X |
| 3,422,120 | 1/1969 | Moffett | 260—268 X |

DONALD G. DAUS, Primary Examiner

U.S. Cl. X.R.

260—591; 424—250

UNITED STATES PATENT OFFICE
CERTIFICATE OF CORRECTION

Patent No. 3,523,120      Dated August 4, 1970

Inventor(s) Laszlo Beregi, et al.

It is certified that error appears in the above-identified patent and that said Letters Patent are hereby corrected as shown below:

Column 1, line 39
Appln. Page 1, line 16:     "$-CH_2-CH-CO-$" should read $$--- \quad -CH_2-\underset{\underset{CH_2}{|}}{CH}-CH_2-CO- \quad ---.$$

Column 1, line 70
Appln. Page 2, line 8:     "a medicaments" should read --- as medicaments ---.

Column 3, line 37
Appln. Page 5, line 5:     "-dimethylphenyl -1'-" should read --- -dimethylphenyl)-1'- ---.

Column 3, line 54
Appln. Page 5, line 20:

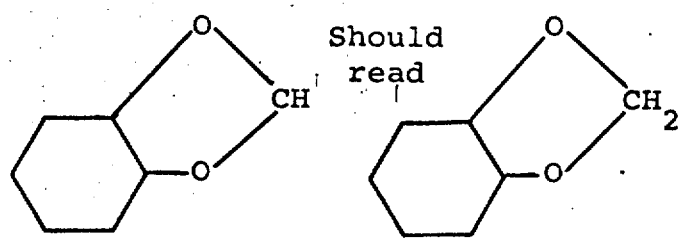

Column 4, line 50
Appln. page 7, Claim 4,
   line 2:     "-4'-yl]piperazine" should read --- -4'-yl)piperazine ---.

Signed and sealed this 1st day of December 1970.

(SEAL)
Attest:

Edward M. Fletcher, Jr.
Attesting Officer

WILLIAM E. SCHUYLER, JR.
Commissioner of Patents